Feb. 24, 1970    W. E. DAVIDSON ET AL    3,496,661
STEAM IRON WATER VALVE STRUCTURE
Filed June 24, 1968
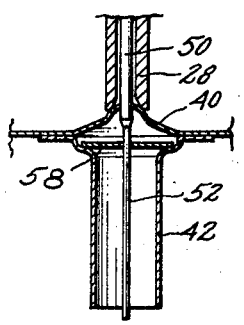
Fig. 3.
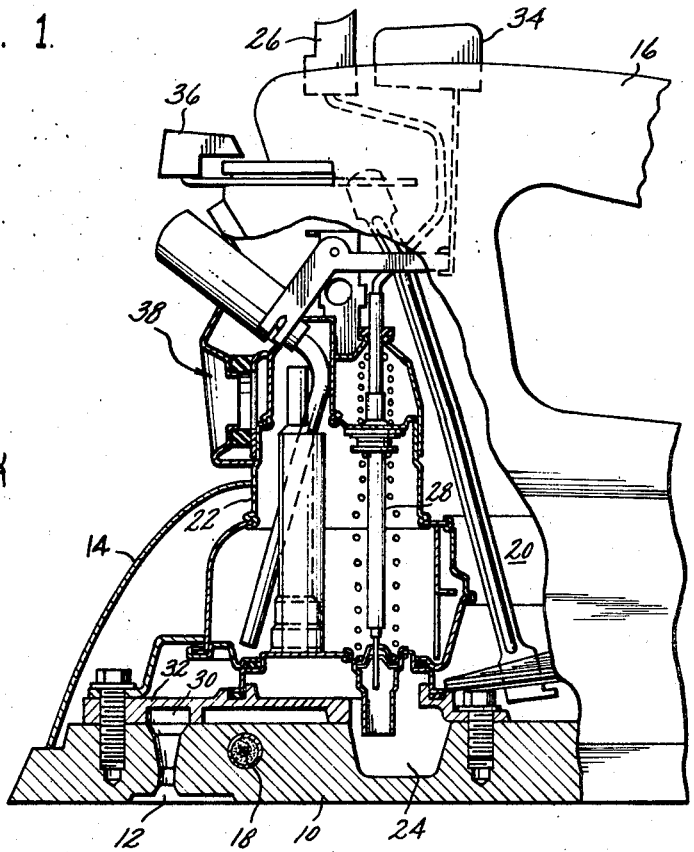
Fig. 1.
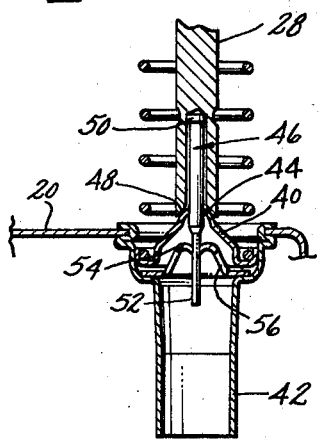
Fig. 2.
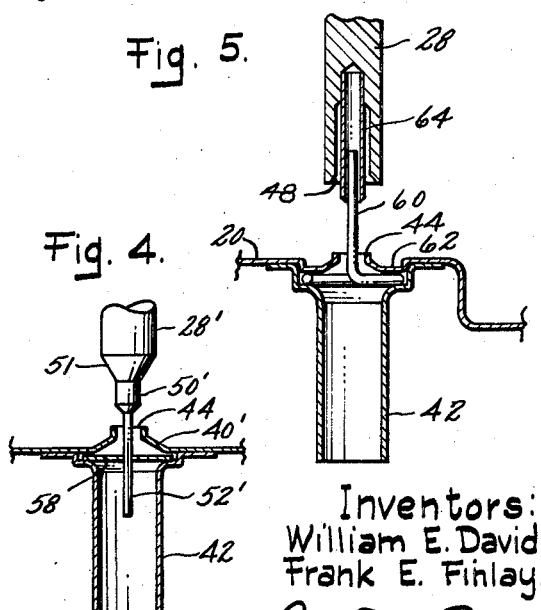
Fig. 4.
Fig. 5.
Inventors:
William E. Davidson
Frank E. Finlayson
by John F. Cullen
Attorney

United States Patent Office 3,496,661
Patented Feb. 24, 1970

3,496,661
STEAM IRON WATER VALVE STRUCTURE
William E. Davidson and Frank E. Finlayson, Ontario, Calif., assignors to General Electric Company, a corporation of New York
Filed June 24, 1968, Ser. No. 739,536
Int. Cl. D06f 75/06, 75/18
U.S. Cl. 38—77.83
11 Claims

ABSTRACT OF THE DISCLOSURE

The invention discloses a steam iron water valve structure to admit feed water into a steam generating chamber. The valve structure is designed to adapt the iron for use with any reasonable tap water available. This is acieved by a scraping or cleaning arrangement of the various orifice and valve structure to remove deposits on each operation.

BACKGROUND OF THE INVENTION

Field of the invention

The invention herein pertains to a steam iron and, more particularly, to a novel feed water valve structure between the iron water tank and the steam generator in the soleplate that is self-cleaning of deposits in the water so that tap water of any reasonable locality may be used.

Description of the prior art

With the advent of irons using water for either steam or spray purposes or both, it is customary to provide a water tank in the iron above the soleplate and to use water valve structure to provide controlled water drippage into a steam generator where it is evaporated and directed out steam holes in the soleplate to steam the article. Additionally, spray attachments have been added to such irons to supply a fine spray, either manually or power operated, from the water tank ot spray onto the garment. Generally it has been preferable to use distilled water in such steam irons because of the fineness of the various water passages and orifices which are subject to clogging due to the mineral deposits from the water, which vary from one locality to another. Distilled water is easily handled by steam irons since deposits are not plated out of the water onto the metal parts. In the hostile hard water localities the tap water contains minerals which produce loose flakes and deposits that plate out on the iron components. These deposits are quite variable from the water in various areas of the country and generally consist of lime or calcium carbonate as well as other chemicals that are in solution in the water or in colloidal suspension. It has been known to provide means for running a clean-out pin through the valve orifice by which the water is dripped onto the soleplate in order to unplug any blockage of the orifice. However, prior art constructions have not provided a design that inherently tends to keep the floating or suspended flakes away from the small feed water orifice and which cleans the parts continuously.

SUMMARY OF THE INVENTION

Briefly described, the present invention is directed to a steam iron that has an enclosed water tank and a fill opening with a heated soleplate at the bottom onto which water is dripped through an orifice to generate steam in a generator in the soleplate. An off-water valve structure is provided to start and stop the water flow from the bottom of the tank to the soleplate and the particular water valve structure has several embodiments in order to prevent the collection of flakes as well as clean the critical parts of the structure of any water deposits formed thereon. Generally, the orifice may be formed in an upwardly domed plate which has a circular orifice at its top, the plate being disposed in the bottom of the tank to meter the flow to the steam generator in the soleplate. A tubular member, which has a peripheral seal, is provided to engage the dome of the plate around the orifice to close the orifice and stop the water flow. A suitable member is disposed in the orifice to protrude through the orifice at all times and this may take the form of a fixed pin extending through the orifice and spaced from it to provide an annulus with the orifice for metering the water whereby the pin also acts as a wick to assist flow and as a pilot for guidance of the valve and the tubular member carries means extending below the sealing surface to scrape the orifice and the pin during each operation to close or open the valve. Alternatively, the structure may take the form of a two-diameter stem that is carried pendulum-like or fixed in the bottom of the tubular member to extend below the sealing surface with the upper portion of the stem being of substantially the same diameter as the orifice to scrape the orifice on movement of the valve and, an additional lower smaller diameter portion is provided on the stem which portion is scraped clean independently and concurrently with the orifice by a scraper plate disposed below the orifice. In this modification, the stem or portion thereof also remains in the orifice at all times to act as a pilot for finding the orifice, and to prevent clogging, and also act as a wick. Thus, the main object of the invention is to provide an improved water valve structure that is self-cleaning, self-guiding, acts as a wick, and inherently tends to repel the accumulation of flakes in the valve orifice whereby the same structure thereby performs four important functions of metering, guiding, cleaning, and flow assisting.

BRIEF DESCRIPTION OF THE DRAWING

FIG. 1 is an elevational view, partially in section and broken away, showing general parts of an iron and illustrating one preferred form of the invention;

FIG. 2 is a partial cross-sectional view of the water valve structure shown in FIG. 1;

FIG 3 is a modification of the structure of FIG. 2;

FIG. 4 is another modification similar to FIG. 3; and

FIG. 5 is still another modification.

DESCRIPTION OF THE PREFERRED EMBODIMENT

Referring first to FIG. 1, there is shown an electric steam iron that may include a spray attachment if desired. The iron includes a soleplate 10 having a plurality of steam ports 12 and an outer shell 14 being connected in any suitable manner to handle 16 all in known fashion. In accordance with conventional practice, soleplate 10 may be cast from a suitable material such as aluminum with an electrical heating element 18 cast in position. This heating element preferably is of the sheath type and, with the electrical resistance element, extends through an outer tubular protective sheath with the heating element separated from the outer sheath by an insulating compound resistant to heat such as granulated and compressed magnesium oxide. The heating element generally extends in a loop beginning at the rear of the iron and along one side to the forward end and then rearwardly along the other side. Thus, substantially uniform heat distribution is provided when the iron is plugged in and activated.

The iron includes means for generating steam by the provision of a water tank 20 which may have vertical forward portion 22 for housing various operating mechanisms. For steam, soleplate 10 has a steam generator cavity or boiler 24 through which, under control of button 26 and spring biased rod 28, water may be dropped from tank 20 onto the hot soleplate, the resulting steam being distributed through passages 30 under cover 32 and out ports 12 onto the fabric being ironed. An additional spray attachment, either manual or power operated and forming no part of the present invention, may be operated by control button 34. A typical power spray iron is shown in U.S. Patent 3,041,757 of common assignment. Temperature control 36 operates to thermostatically control the heat generated in the soleplate in a known manner. In order to supply water to the tank 20 for steam and/or spray, fill opening 38 is provided with direct communication to the tank. Depending on the particular design of the iron, the fill opening and control knobs may be in various locations. Generally steam irons of the type described preferably use distilled water for best operation because of the purity of such water. Many operators simply do not use distilled water but use tap water and in time, depending on the locality, the water passages become clogged. Some irons have used a clean-out pin to project through the metering orifice and remove scale that accumulates. Generally, the collection area around the orifice has been such that flakes tend to collect because of the cup-shaped structure employed. When the clean-out pin is removed, flakes can funnel into the water orifice and adversely affect the operation of the orifice. Typical structure is shown in U.S. Patent 3,041,756 of common assignment. The present invention is designed to improve on the water valve structure heretofore used and is also an improvement on the structure of copending application Ser. No. 739,238 of even date and common assignment.

In order to prevent the accumulation of deposits at the metering orifice of the water valve around the bottom of rod 28, and to provide a protruding element in the orifice at all times thus changing the orifice to an annular orifice as well as using the protruding member as a wick to assist flow and as a pilot guide, several modifications are disclosed. Referring to FIG. 2, the actual on-off water valve structure is shown in a preferred modification. In such modification, there is provided in the bottom of the water tank 20, an upwardly domed plate 40 which may be press fitted or otherwise suitably secured in water duct 42 which is used to carry the water to drip on the soleplate. The domed plate 40 may be formed to provide a base for the spring to bias rod 28 upwardly as shown. In order to meter or control the water flow, orifice 44 is formed in the top of domed plate 40. It will readily be seen that the sides of upwardly domed plate 40 inherently tend to float away or repel any flakes or deposits in the water and thus carry them away from the orifice. However, since flakes can deposit directly on the orifice itself, it is desired to prevent this as much as possible and to this end, a member in the form of an elongated stem 46 is supported pendulum-like in the lower end of tubular rod 28. This may be done by an enlarged head on the upper end of stem 46 and staking of the sides of rod 28 as shown. Thus, stem 46 is free to center itself and is designed to project or protrude through the orifice 44 at all times thus locating itself. For sealing against water flow in the off-position, the bottom of stem 28 has a sealing periphery 48 which contacts the upper portion of domed plate 40 around the orifice to provide a good seal. Preferably, for tight contact, the top portion of domed plate 44 may have a bulbous portion as shown for a ball joint type seal, although the upward dome alone inherently provides good sealing. In order to protrude through the orifice at all times, stem member 46, which is preferably cylindrical as is the orifice but may obviously be any suitable shape, extends beyond sealing periphery 48 and is formed in two preferably concentric portions, upper portion 50 of substantially the same cross-section as the orifice to provide a scraping action therewith and lower portion 52 of smaller cross-section so that, when withdrawn into orifice 44, it forms an annulus for the metered flow of water therethrough. The rate of flow obviously depends on the relative diameters of the orifice and the stem portion 52 and may be varied as desired. It will be apparent that upon movement of rod 28, upper portion 50 will ream out or scrape the orifice 44 suitably clean of any deposits. Since stem 46 is resident in the orifice at all times and lower portion 52 is disposed in the orifice during the metering of the water, it is important that portion 52 not be subject to enlargement from coating or deposits from the water. To this end, a scraper plate 54 is provided below the domed orifice plate 40 and, for proper alignment, can preferably move about slightly as shown. Scraper plate 54 is provided with opening means 56 that may take any suitable form such as perforations through the plate or indentations along the side of the plate to provide means for the passage of water through the plate as shown. Also, the plate itself may be of any suitable shape so long as it acts as a scraper. The slight top indentation, while not required, is intended to help in assembly and is less apt to snag and retain lint. The lower portion 52 is thus independently cleaned by extending through scraper plate 54 so that it is concurrently scraped on each operation of the water valve. In operation of the FIG. 2 embodiment, there is no tendency for the flakes to be entrapped around the domed orifice plate because the slanting sides repel the flakes and no flakes clog the orifice because of the presence at all times of the stem 46 in the orifice. Movement of the valve structure to a down or sealing off-position, guided by the pilot function of 52, thus scrapes the orifice clean with the outer surface of the upper portion of stem 46 while scraper plate 54 independently and concurrently cleans lower portion 52 of stem 46 as seen in FIG. 2. Movement of the valve to the out of sealing or on-position withdraws the upper stem portion 50, again cleaning the orifice, completely out of the orifice and draws lower portion 52, which is also again cleaned by scraper plate 54, into the orifice to provide a clean stem 52 and annular orifice 44 for the metering of the water through orifice 44, scraper plate openings 56, water duct 42 and onto the soleplate below. At the same time, the presence of lower portion 52 in the orifice acts as a wick to assist the flow. Further flow assistance may be obtained by drilling orifice 44 so that the burr is upward to provide good drip characteristics. Stem 46 performs four functions, it cleans the orifice of deposits, it meters by the annular orifice, it pilots or guides the parts and it acts as a wick by remaining in the orifice at all times.

Referring next to FIG. 3, a simplified modification of FIG. 2 structure is shown with like numerals referring to like parts. In this modification dome 40 may be formed separate, or at the bottom of the tank, or as an integral part of the lower portion of the tank 20 as shown. Similarly, scraper plate 58 having suitable openings means like FIG. 2 but not shown, may be flat for ease of manufacture. This modification has the advantage that it eliminates any well around the edge of the scraper plate which might entrap flakes to be carried through orifice 44. The operation of FIG. 3 is identical to FIG. 2.

FIG. 4 illustrates another modification, similar to FIG. 3, wherein rod 28′ may have its stem portion supported in the lower end as an integral extension so lower portion 52′ protrudes through orifice 44 in plate 40′ and upper portion 50′ scrapes the orifice. Lower portion 52′ is concurrently and independently scraped clean by scraper plate 58 and portion 51 is used to seal the orifice around its dome. The operation is generally like that of FIG. 3 and the term "tubular member" is intended to include the equivalent solid form of rod 28′ as shown.

Referring next to FIG. 5, another modification is shown wherein like numerals refer to like parts. In this modification, the protruding stem member in orifice 44 is a fixed pin 60. A similar upward domed orifice plate 62 also repels flakes away from orifice 44. Pin 60 is of smaller cross-section than orifice 44 as shown and may be secured between tank 20 and water duct 42 in any manner as by loosely enclosing a loop therebetween as shown. With the fixed pin in orifice 44, again a metering annular orifice is formed between the pin and plate 62. Generally, though not required, the parts are cylindrical and concentric. In order to provide the cleaning action as heretofore described, rod 28 may have a scraper tube 64 disposed in the lower end of tubular rod 28 by press fitting it therein as shown or by any other suitable pendulum-like attachment. Again tube 64 extends beyond the peripheral sealing surface of rod 28 and tube 64 is designed to scrape fixed pin 60 by its inner surface on motion relative to the pin. At the same time, the outer surface of tube 64 independently scrapes orifice 44 clean as the rod 28 moves on each operation of the water valve structure. By its continued presence in the orifice, the pin 60 also acts as a wick to assist flow through orifice 44 and a guide for the moving parts.

Thus, in all modifications, a scraping means is provided which is movable relative to the orifice to scrape deposits from the orifice on each operation of the valve. At the same time, a member is disposed at all times in the orifice during flow to act as a wick and guiding pilot and this member is also independently and concurrently scraped on each operation of the valve so that the metering orifice is continuously kept clean of deposits. The upwardly domed orifice plate structure tends to repel any flakes and any other deposits or loose particles that do enter the orifice are immediately removed by the relative scraping motion to maintain an accurate and clean annular metering orifice.

While there have been shown preferred forms of the invention, obvious equivalent variations are possible in light of the above teachings without departing from the invention.

What is claimed is:

1. In a steam iron having an enclosed water tank with a fill opening thereto and a steam generating soleplate, an on-off water valve structure operable to start and stop the flow of water from said tank to the soleplate to generate steam comprising,
   orifice means controlling the rate of flow in the valve-on position,
   scraping means including a first member connected to protrude through said orifice at all times,
      said scraping means connected to said valve and movable relative to said orifice to scrape deposits from said orifice, and
   separate means in said valve structure to independently scrape said protruding first member concurrently with the scraping of said orifice on each operation of said valve structure.

2. Apparatus as described in claim 1 wherein said scraping means first member protruding through said orifice provides an annular water opening therebetween, and
   a second member concentrically disposed with respect to the first memebr and movable relative to said orifice to scrape the orifice.

3. Apparatus as described in claim 1 wherein said scraping means includes a tubular member connected to said valve structure and said first member is a stem concentric with said tubular member and forming an annulus with said orifice to act as a wick, deflector, and pilot through the orifice in valve-on position.

4. Apparatus as described in claim 1 wherein said valve structure comprises a tubular member having a sealing periphery at its lower end,
   said first member forming an elongated stem supported pendulum-like in the lower end of said tubular member and extending beyond the sealing periphery,
      said stem protruding member including an upper portion of substantially orifice cross-section and a lower portion of smaller cross-section,
   a scraper plate having opening means therein and disposed below said orifice,
   said lower portion also extending through said scraper plate in scraping contact therewith,
   whereby movement of said valve structure to sealing off-position scrapes both orifice and protruding member with the upper portion and scraper plate respectively, and movement of said valve structure out of sealing to on-position withdraws said upper stem portion from the orifice and draws said lower portion into said orifice to form an annulus therewith for metering water through the annulus and scraper opening to the soleplate below.

5. Apparatus as described in claim 1 wherein said valve structure comprises a tubular member having a sealing periphery at its lower end, and said first member is a fixed pin extending through said orifice to form an annulus therewith,
   a scraper tube disposed in the lower end of said tubular member and extending beyond said sealing periphery,
      said tube surrounding said pin in scraping relation therewith,
   whereby movement of said valve structure to sealing off-position scrapes the pin by the inner surface of said tube and the outer lower surface of said tube scapes the orifice, and movement of said valve structure out of sealing to on-position uncovers said annulus for metering water through the annulus to the soleplate below.

6. Apparatus as described in claim 4 wherein said orifice is formed in the top of an upwardly domed plate, said sealing periphery contacting said domed plate for tight sealing contact therewith.

7. In a steam iron having an enclosed water tank with a fill opening thereto and a steam generating soleplate, an on-off water valve structure operable to start and stop water flow from the bottom of said tank to the soleplate to generate steam comprising,
   an upwardly domed orifice plate having a circular orifice at the top thereof disposed in the bottom of said tank and metering flow to the soleplate,
   a tubular member having a peripheral seal adapted to engage the dome of the orifice plate around and close said orifice,
   a member connected to protrude through said orifice at all times, and
   cylindrical means extending below said seal and connected for movement with said tubular member into said orifice to scrape said orifice on each operation of said valve structure.

8. Apparatus as described in claim 7 wherein said protruding member through said orifice provides an annular water opening therebetween, and
   said cylindrical means is concentrically disposed with respect to the protruding member.

9. Apparatus as described in claim 7 wherein said protruding member through said orifice provides an annular water opening therebetween and acts as a wick through the orifice in valve-on position, and
   said cylindrical scraping means is connected directly to the tubular member of said valve structure and is concentric with said protruding member.

10. Apparatus as described in claim 7 wherein said valve structure is directly connected to said tubular member and said cylindrical means and protruding member comprise an elongated stem supported in the lower end of said tubular member and extending beyond the sealing periphery,
    said stem protruding member including an upper portion of substantially orifice cross-section and a lower portion of smaller cross-section,
    a scraper plate having opening means therein and disposed below said orifice, said lower portion also extending through said scraper plate in scraping contact therewith, whereby movement of said valve structure to sealing-off position scrapes both orifice and protruding member with the upper portion and scraper plate respectively, and movement of said valve structure out of sealing to on-position withdraws said upper stem portion from the orifice and draws said lower portion into said orifice to form an annulus therewith for metering water through the annulus and scraper opening to the soleplate below.

11. Apparatus as described in claim 7 wherein said valve structure is directly connected to said tubular member, said protruding member comprising a fixed pin in said orifice to form an annulus therewith, said cylindrical means comprising a scraper tube disposed in the lower end of said tubular member, said scraper tube surrounding said pin in scraping relation therewith, whereby movement of said valve structure to off-position seals the orifice and said pin is scraped by said tube inner surface and the lower end of said tube outer surface scrapes the orifice, and movement of said valve structure to on-position unseals said orifice and annulus for metering water through said annulus to the soleplate below.

References Cited
UNITED STATES PATENTS

| | | | |
|---|---|---|---|
| 2,353,426 | 7/1944 | Morton | 38—77 |
| 2,880,530 | 4/1959 | Schwaneke | 38—77 |
| 2,887,799 | 5/1959 | Kuhn et al. | 38—77 |

PATRICK D. LAWSON, Primary Examiner